United States Patent

Muto et al.

Patent Number: 6,025,300
Date of Patent: Feb. 15, 2000

[54] THERMAL TRANSFER IMAGE-RECEIVING SHEET

[75] Inventors: Atsushi Muto; Koichi Shirai, both of Shinjuku-Ku, Japan

[73] Assignee: Dai Nippon Printing Co., Ltd, Japan

[21] Appl. No.: 09/078,532

[22] Filed: May 13, 1998

[30] Foreign Application Priority Data

May 26, 1997 [JP] Japan ................................. 9-149935

[51] Int. Cl.[7] ............................. B41M 5/035; B41M 5/38
[52] U.S. Cl. ........................ 503/227; 428/195; 428/500; 428/913; 428/914
[58] Field of Search ................ 8/471; 428/195, 428/913, 914, 500; 503/227

[56] References Cited

U.S. PATENT DOCUMENTS 5,214,024 5/1993 Beck et al. ............................. 503/227
5,646,090 7/1997 Tamura et al. ......................... 503/227

FOREIGN PATENT DOCUMENTS 0 727 324 A1 8/1996 European Pat. Off. ............... 503/227
0 764 547 A2 3/1997 European Pat. Off. ............... 503/227

OTHER PUBLICATIONS

Patent Abstracts of Japan; vol. 15, No. 333 (M–1150), Aug. 23, 1991 & JP 03 128289 A (DAI Nippon Printing Company Limited); May 31, 1991 *abstract*.
Patent Abstracts of Japan; vol. 96, No. 6, Jun. 28, 1996 & JP 08 034169 A (Mitsubishi Paper Mills, Limited); Feb. 6, 1996 *abstract*.
Patent Abstracts of Japan; vol. 15, No. 333 (M–1150); Aug. 23, 1991 & JP 03 128291 A (Dai Nippon Printing Company Limited); May 31, 1991 *abstract*.

*Primary Examiner*—Bruce H. Hess
*Attorney, Agent, or Firm*—Parkhurst & Wendel, L.L.P.

[57] ABSTRACT

In a thermal transfer image-receiving sheet comprising at least a colorant-receptive layer and a laminated substrate layer, particularly including a plastic sheet, provision of at least one antistatic layer in the substrate layer can offer high antistatic effect both before and after printing of an image.

8 Claims, 4 Drawing Sheets

THERMAL TRANSFER IMAGE-RECEIVING SHEET

FIELD OF THE INVENTION

This invention relates to a thermal transfer image-receiving sheet for use in a thermal transfer system wherein a thermal transfer image-receiving sheet is superposed on a thermal transfer sheet and a colorant is thermally transferred from the thermal transfer sheet onto the thermal transfer image-receiving sheet to form an image on the thermal transfer image-receiving sheet, and more particularly to a thermal transfer image-receiving sheet for a thermal transfer system using a sublimable dye as a colorant.

BACKGROUND OF THE INVENTION

Formation of letters or images on an object by a thermal transfer system has hitherto been carried out in the art. A thermal dye transfer system and a thermal ink transfer system have been extensively used as the thermal transfer system. The thermal dye transfer system is such that a sublimable dye is used as a colorant, and the dye in a sublimable dye layer provided in a thermal transfer sheet is thermally transferred onto an object, such as a thermal transfer image-receiving sheet, by means of a heating device, such as a thermal head, wherein generation of heat is regulated according to image information, thereby forming an image on the object.

In the thermal dye transfer system, the amount of the dye transferred can be regulated for each dot by heating in very short time. The image thus formed is very sharp, because the colorant used is a dye, and, at the same time, is highly transparent. Therefore, the image has excellent halftone reproduction and gradation, high definition, and high quality comparable to that of full-color photographic images using a silver salt.

A thermal transfer image-receiving sheet, for thermal dye transfer, used in the thermal dye transfer system (hereinafter referred to as "thermal transfer image-receiving sheet") generally comprises a colorant-receptive layer provided on a substrate layer. Properties required for the image-receiving sheet include not only high sensitivity in printing but also minimized electrification (electro static charge) during printing by means of a printer. Electrification of the image-receiving sheet by static electricity results in deposition of dust on the surface of the image-receiving sheet or generation of cockling in a thermal transfer sheet which comes into contact with the thermal transfer image-receiving sheet, posing a problem that the appearance of the formed image is deteriorated. Further, in some cases, additional problems arise such as a failure of the image-receiving sheet to be carried due to sticking of the image-receiving sheet to the thermal transfer sheet or sticking of the thermal transfer image-receiving sheet to a portion within the printer. Furthermore, also in the course of the production of the image-receiving sheet, discharge or a shock on the human body often occurs.

A conventional method for preventing electrification of the image-receiving sheet is to impart the function of preventing electrification to the printer itself. The effect, of preventing the electrification of the thermal transfer image-receiving sheet, attained by this method, however, is unsatisfactory. Another conventional method is to form an antistatic layer in the thermal transfer image-receiving sheet itself. The formation of the antistatic layer using a surfactant in the thermal transfer image-receiving sheet results in the development of sticking in the thermal transfer image-receiving sheet, thereby to cause a problem of blocking of the thermal transfer image-receiving sheet. This in turn causes problems such as deteriorated carriability of the thermal transfer image-receiving sheet within the printer and transfer of the antistatic agent onto the thermal transfer sheet at the time of printing, resulting in deteriorated antistatic effect.

Further, bleedout of the surfactant and the like unfavorably adversely affects color development of the dye and storage stability of the image. A resin-based antistatic layer is often formed as an intermediate layer between the dye-receptive layer and the substrate layer. In this case, the whiteness of the image-receiving sheet is disadvantageously deteriorated because the resin per se is colored. When a plastic sheet which is easily electrified, such as polyethylene terephthalate, is used as a core material, problems arise such as unsatisfactory antistatic effect.

Accordingly, an object of the present invention is to provide a thermal transfer image-receiving sheet which can exhibit high antistatic effect both before and after printing of an image by providing an antistatic layer in a laminated substrate layer in a thermal transfer image-receiving sheet comprising a laminated substrate layer, particularly including a plastic sheet.

DISCLOSURE OF THE INVENTION

The above object of the present invention can be attained by a thermal transfer image-receiving sheet comprising at least a colorant-receptive layer and a laminated substrate layer, the laminated substrate layer comprising at least one antistatic layer.

According to the present invention, in a thermal transfer image-receiving sheet using a laminated substrate layer, particularly including a plastic sheet, provision of at least one antistatic layer in the laminated substrate layer can offer high antistatic effect both before and after printing of an image.

PREFERRED EMBODIMENT OF THE INVENTION

The present invention will be described in more detail with reference to the following preferred embodiments.

Figure 1:
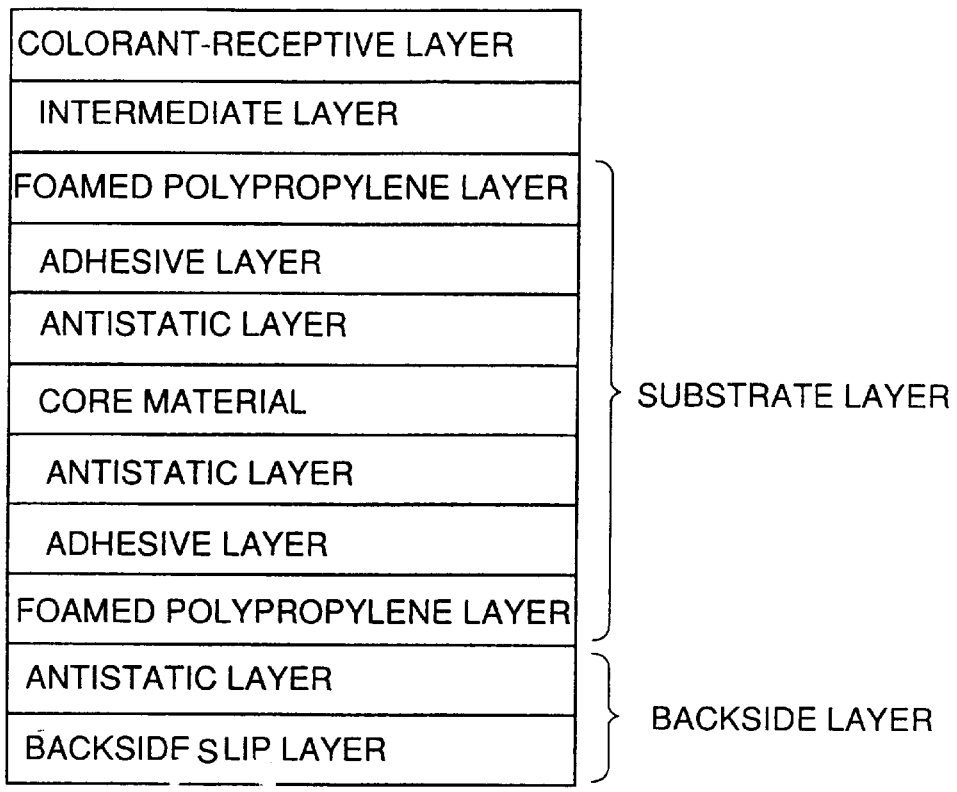
FIG. 1 is a diagram showing the layer construction of a thermal transfer image-receiving sheet according to a preferred embodiment of the present invention.
Figure 7:
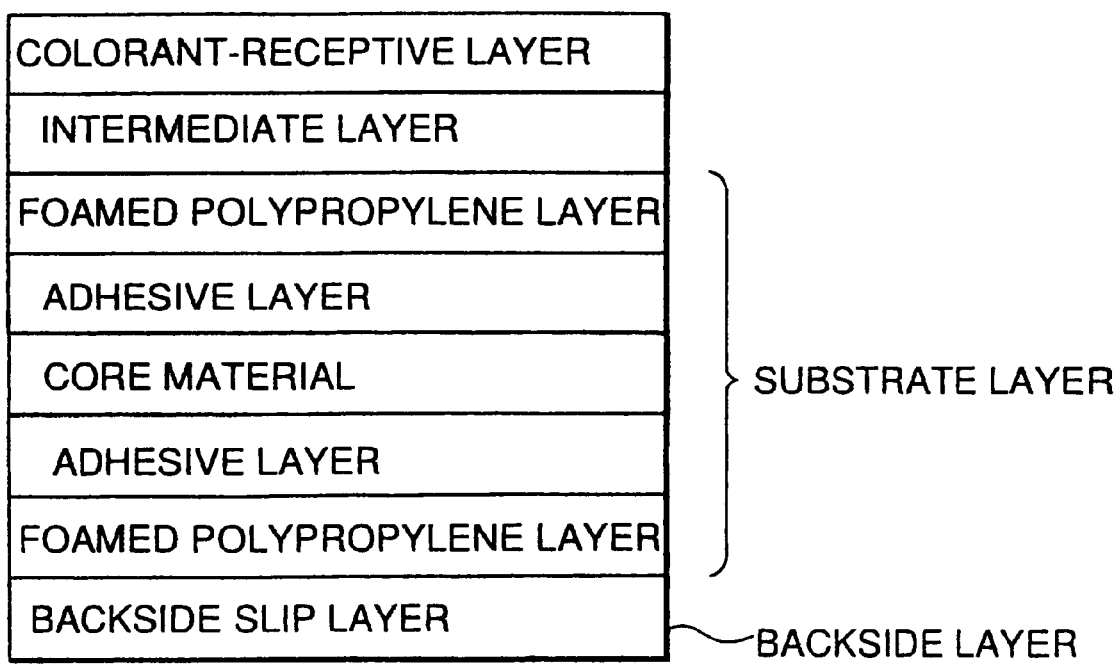
FIG. 7 is a diagram showing the layer construction of a comparative thermal transfer image-receiving sheet.

FIG. 1 is a diagram illustrating the layer construction of a thermal transfer image-receiving sheet according to the most preferred embodiment of the present invention, FIGS. 2 to 6 are diagrams showing the layer construction of thermal transfer image-receiving sheets according to other preferred embodiments of the present invention, and FIG. 7 is a diagram showing the layer construction of a comparative thermal transfer image-receiving sheet.

As shown in the drawings, the thermal transfer image-receiving sheet according to the present invention comprises a colorant-receptive layer and a laminated substrate layer, characterized in that at least one antistatic layer is provided in the substrate layer. By virtue of this layer construction, the thermal transfer image-receiving sheet of the present invention, even when it undergoes a change in environmental atmosphere, can exhibit high antistatic effect for a long period of time. The construction of the colorant-receptive layer, the substrate layer, and the optional backside slip layer will be described in more detail.

Substrate layer

The substrate layer comprises at least a core material. If necessary, desired layers, such as an intermediate layer (a primer layer), a cushioning layer, and an adhesive layer, may be provided between the substrate layer and the colorant-receptive layer. According to the present invention, at least one layer of the layers constituting the substrate layer is constituted by an antistatic layer.

Core material

Core materials in the substrate layer usable herein include various papers, such as wood free papers, coat papers, art papers, cast coated papers, and glassine papers, synthetic papers, unwoven fabrics, and plastic sheets of polyethylene terephthalate, acrylic resin, polyethylene, polypropylene and the like. Use of plastic sheets of polyethylene terephthalate as the core material is particularly advantageous in the present invention. The thickness of the plastic sheet is preferably about 10 to 300 μm.

Antistatic layer

The formation of the antistatic layer using a surfactant or the like on the surface of the thermal transfer image-receiving sheet has hitherto caused problems of the development of sticking in the thermal transfer image-receiving sheet and the transfer of the antistatic agent onto the backside slip layer. These problems in turn caused a lowering in antistatic effect with the elapse of time. According to the present invention, the above problems do not occur because the antistatic layer is provided in the substrate layer.

Further, there is a conventional method wherein a conductive layer is formed using a conductive metal oxide, such as conductive carbon black or tin oxide, and a binder and is used as an antistatic layer. In many cases, the conductive agent is black or other color colored one, resulting in deteriorated appearance of the resultant thermal transfer image-receiving sheet. According to a preferred embodiment of the present invention, a colorless or light-colored antistatic agent rather than the above deep-colored antistatic agent is used.

Colorless or light-colored antistatic agents usable herein include, for example, fatty acid esters, sulfuric esters, phosphoric esters, amides, quaternary ammonium salts, betaines, amino acids, acrylic resins, sulfonated polyaniline, and ethylene oxide adducts. Resins having an antistatic function are also useful as the antistatic agent. Antistatic resins usable herein include, for example, a conductive resin prepared by introducing a group having an antistatic effect, such as a group derived from a quaternary ammonium salt, phosphoric acid, vinylpyrrolidone, or sulfonic acid, into a resin, such as acrylic resin, vinyl resin, or cellulosic resin, or by copolymerizing the above resin with the above group.

In the present invention, use of the antistatic resin as the antistatic agent is preferred. Among others, cationic acrylic resins and sulfonated polyanilines are suitable.

Cationic acrylic resins usable herein include homo- or copolymers of acrylic monomers having a cationic group, or copolymers of acrylic monomers having a cationic group with other monomers. Acrylic monomers having a cationic group include, for example, (meth)acrylic ester monomers having a tertiary amino group, such as dimethylaminoethyl (meth)acrylate, diethylamino (meth)acrylate, diethanolamino (meth) acrylate, dipropylamino (meth)acrylate, dipropanolamino (meth)acrylate, and dibutylamino (meth) acrylate and monomers prepared by quaternizing the above monomers.

Cationic acrylic resins usable herein include, for example, homo- or copolymers of monomers prepared by reacting monomers having a reactive group, such as a carboxyl or hydroxyl group, for example, acrylic acid, methacrylic acid, or a mono(meth)acrylate prepared from acrylic acid or methacrylic acid and a glycol, such as ethylene glycol, with a reactive quaternary ammonium salt, such as glycidyltrimethylammonium chloride, 3-chloro-2-hydroxypropyltrimethylammonium chloride, 3-chloro-2-hydroxypropyltriethanolammonium chloride, glycidyltrimethylammonium chloride, glycidyldimethylbenzylammonium chloride, or glycidyldimethylbutylammonium chloride, or copolymers of the above monomers with other monomers. Various cationic acrylic resins of the above type usable herein are available from Soken Chemical Engineering Co., Ltd. under the tradename Elecond.

In the present invention, an antistatic resin comprising the above cationic acrylic resin and an epoxy resin may also be used. This type of antistatic resin is commercially available as a two-pack antistatic adhesive comprising a cationic acrylic resin and an epoxy resin, and an example of such a commercially available antistatic resin is BONDEIP (registered trademark) manufactured by Konishi Co., Ltd.

Epoxy resins for crosslinking or curing the cationic acrylic resin usable herein include, for example, conventional epoxy resins, such as bisphenol A diglycidyl ether, bisphenol F diglycidyl ether, bisphenol A diglycidyl ether, bisphenol S diglycidyl ether, bisphenol A di-βmethylglycidyl ether, bisphenolhexafluoroacetone diglycidyl ether, tetraphenyl diglycidyl ether, trimethylolpropane triglycidyl ether, resorcinol diglycidyl ether, and hydrogenated bisphenol A diglycidyl ether.

Each of the acrylic resin (main agent) and the epoxy resin (curing agent) may be used as a 10 to 50 wt % solution thereof in water, methanol, ethanol, isopropyl alcohol, acetone, methyl ethyl ketone, methyl isobutyl ketone, ethyl acetate, toluene, xylene or a mixture of two or more of the above solvents. In use, the acrylic resin solution and the epoxy resin solution are mixed together in an equivalent ratio of about 1:1, and, if necessary, the mixture is diluted.

Various sulfonated polyanilines are known in the art, and one example thereof is a sulfonated polyaniline represented by the following structural formula:

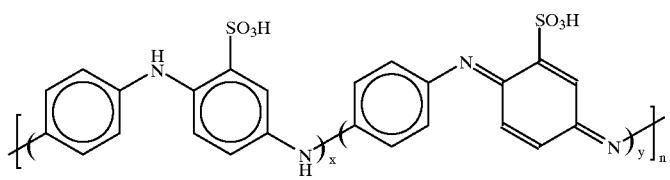

wherein x, y, and n are numbers which bring the molecular weight of the sulfonated polyaniline to about 300 to 10,000.

The above sulfonated polyaniline is soluble in water or a solvent containing an alkali and water and, when dissolved, forms an intramolecular salt or an alkali salt. Sulfonated polyanilines of this type usable herein are commercially available, for example, from Nitto Chemical Industry Co., Ltd. under the tradename aquaSAVE-01Z in the form of an aqueous solution, a water dispersion, a solution or dispersion in a mixed solvent composed of water and an organic solvent. Although the solution or the dispersion is generally yellowish, it is substantially colorless when the concentration is low.

When the sulfonated polyaniline is used as the antistatic agent, preferably, the sulfonated polyaniline is incorporated into a binder having good adhesion to a plastic sheet. Binders usable herein include, for example, polyester resin, urethane resin, polyacrylic resin, polyvinyl alcohol, epoxy resin, butyral resin, polyamide resin, polyether resin, and polystyrene resin. Among them, polyester resins having a carboxyl group are particularly preferred from the viewpoint of the adhesion to the substrate layer, the compatibility with the sulfonated polyaniline and the like.

A preferred composition of a coating liquid for the antistatic layer comprises about 2 to 10% by weight, preferably 4 to 4.75% by weight, of a binder resin, about 0.1 to 5% by weight, preferably 0.25 to 1% by weight, of sulfonated polyaniline, and 0 to 2% by weight, preferably 0.2 to 1% by weight, of a surfactant.

Preferably, the antistatic layer formed of the antistatic agent is provided on both sides of the core material. In this case, a thermal transfer image-receiving sheet can be provided which can offer excellent antistatic effect for a long period of time.

The antistatic layer, when a different layer is provided from an organic solvent on the antistatic layer, often loses the homogeneity thereof due to the organic solvent, making it difficult to attain the original antistatic effect. Therefore, preferably, the antistatic layer has solvent resistance. The term "solvent resistance" used herein means that the solubility of the antistatic layer in methyl ethyl ketone, toluene, or ethyl acetate is not more than 10% by weight.

Methods for forming a solvent-resistant antistatic layer include, for example, one wherein the antistatic agent is mixed with a solvent-resistant resin and an antistatic layer is formed from the mixture and one wherein an antistatic layer is formed from an antistatic resin which as such has solvent resistance.

The solvent-resistant resin may be any resin so far as, as described above, the solubility thereof in methyl ethyl ketone, toluene, or ethyl acetate is not more than 10% by weight. Antistatic resins which as such have solvent resistance include, for example, cationic acrylic resins having the following structure. Cationic acrylic resins having the following structure include, for example, a commercially available resin Elecond PQ-10 (tradename, manufactured by Soken Chemical Engineering Co., Ltd.).

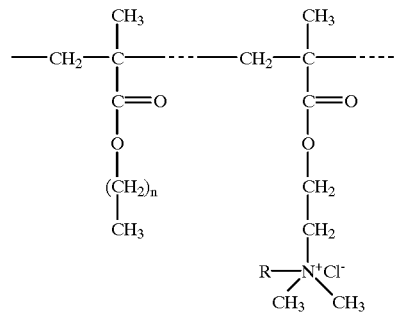

In the above structure, preferably, R represents a lower alkyl group, such as a methyl group, n is not more than 5, particularly preferably not more than 2, from the viewpoint of the solvent resistance.

Cushioning layer

In this way, the antistatic layer is formed. Preferably, a cushioning layer is provided on the surface of the antistatic layer from the viewpoint of providing high sensitivity in printing and, at the same time, providing high image quality free from uneven density and dropouts.

A plastic sheet or synthetic paper having micropores in its interior may be used as the cushioning layer. Alternatively, a cushioning layer may be formed by various coating methods on various substrate layers.

The plastic sheet or synthetic paper having micropores in its interior is preferably a plastic sheet or synthetic paper prepared by blending a polyolefin, particularly polypropylene, as a major compound with an inorganic pigment and/or a polymer incompatible with polypropylene to prepare a blend as a foaming initiator and subjecting the blend to stretching and film formation.

The above plastic sheet or synthetic paper may have a single layer structure which as such has micropores. Alternatively, it may have a multi-layer structure. In the case of the multi-layer structure, all the layers constituting the multi-layer structure may have micropores, or alternatively, a part of the layers may be free from micropores. If necessary, a white pigment may be incorporated as an opacifying agent into the plastic sheet or synthetic paper. Additives, such as fluorescent brighteners, may be added in order to increase the whiteness. The thickness of the cushioning layer is preferably 30 to 80 μm.

The cushioning layer may be formed by coating on the substrate. Resins for the cushioning layer usable herein include conventional resins, such as polyester, urethane resin, polycarbonate, acrylic resin, polyvinyl chloride, and polyvinyl acetate. They may be used alone or a blend of two or more.

Preferably, the cushioning layer may be provided on both the upper and lower surfaces of the antistatic layer. In this case, if necessary, an adhesive may be used. The above antistatic agent may be added to the adhesive, and the adhesive containing the antistatic agent may be used to form the antistatic layer.

Intermediate layer

A colorant-receptive layer described below is provided on the surface of one of the upper and lower cushioning layers. The surface of the cushioning layer may be subjected to corona discharge treatment or ozone treatment to improve the adhesion of the cushioning layer to the colorant-receptive layer, and, in addition, a primer layer may be provided as the intermediate layer. Further, if necessary, additives, such as titanium oxide, calcium carbonate, barium sulfate and other conventional inorganic pigments and organic fillers and fluorescent brighteners, may be added from the viewpoint of imparting the whiteness, opaqueness and other functions.

Colorant-receptive layer

The colorant-receptive layer in the thermal transfer image-receiving sheet of the present invention may be formed of a varnish, composed mainly of a resin having good dyeability with the colorant, with various additives, such as release agents, being optionally added thereto. Representative examples of resins having good dyeability include polyolefin resins, such as polypropylene, halogenated resins, such as polyvinyl chloride and polyvinylidene chloride resins, vinyl resins, such as polyvinyl acetate and polyacrylic esters, and copolymers thereof, polyester resins, such as polyethylene terephthalate and polybutylene terephthalate, polystyrene resins, polyamide resins, copolymers of olefins, such as ethylene or propylene, with other vinyl monomers, polyurethane, polycarbonate, acrylic resins, ionomers, and cellulose derivatives. They may be used alone or a mixture of two or more. Among them, polyester resins and vinyl resins are preferred.

Various release agents may be incorporated into the colorant-receptive layer from the viewpoint of preventing the colorant-receptive layer from being heat-fused to the thermal transfer image-receiving sheet during the formation of an image. Release agents usable herein include phosphoric ester plasticizers, fluoro compounds, and silicone oils. Among them, silicone oils are preferred. Various modified silicones, including dimethyl silicone, may be used. Specific examples thereof include amino-modified silicone, epoxy-modified silicone, alcohol-modified silicone, vinyl-modified silicone, and urethane-modified silicone. They may be used alone or a blend of two or more. Further, they may be used after polymerization utilizing various reactions.

If necessary, an intermediate layer may be provided between the colorant-receptive layer and the substrate layer. The intermediate layer may be formed of any material depending upon the purposes. For example, use of resins with various white pigments added thereto can offer high whiteness. Further, if necessary, fluorescent brighteners, antistatic agents and the like may be added.

The colorant-receptive layer may be coated by a conventional method, such as roll coating, bar coating, gravure coating, gravure reverse coating, or extrusion coating. The coverage is preferably about 0.5 to 10 $g/m^2$ (solid basis; the coverage, which will be hereinafter referred to in connection with the present invention, being on a solid basis unless otherwise specified).

Backside slip layer

Preferably, a backside slip layer, having a thickness of, for example, about 1 to 5 $g/m^2$, formed of a resin having excellent slipperiness, for example, an acrylic resin or acrylic silicone resin, with a suitable slip particle being optionally added thereto is provided on the surface of the cushioning layer remote from the colorant-receptive layer. In this case, provision of the backside slip layer through the antistatic layer or antistatic adhesive layer results in further improved antistatic properties of the thermal transfer image-receiving sheet according to the present invention.

Thermal transfer sheets usable with the thermal transfer image-receiving sheet of the present invention are such that a dye layer containing a sublimable dye is provided on paper or a polyester film. Any conventional thermal transfer sheet as such may be used in the present invention.

In the thermal transfer, thermal energy may be applied by any conventional means. For example, desired results can be satisfactorily provided by applying a thermal energy of about 5 to 100 $mJ/mm^2$ through the control of a recording time by means of a recording device, such as a thermal printer (for example, a video printer VY-100, manufactured by Hitachi, Limited).

Next, preferred embodiments, of the thermal transfer image-receiving sheet according to the present invention, shown in the drawings will be described. A thermal transfer image-receiving sheet according to one preferred embodiment of the present invention is shown in FIG. 1. In FIG. 1, a substrate layer comprises a 10 to 30 μm-thick core material, an about 0.1 to 10 μm-thick antistatic layer provided on both sides of the core material, and a foamed polypropylene layer provided, through about 0.1 to 50 μm-thick adhesive layer, on the surface of each of the antistatic layers. The thickness of the substrate layer is generally about 50 to 350 μm. An about 1 to 50 μm-thick colorant-receptive layer is provided through an about 0.1 to 10 μm-thick intermediate layer on one side of the substrate layer, and a backside slip layer is provided through an about 0.1 to 10 μm-thick antistatic layer on the other side of the substrate layer. The thickness of the whole thermal transfer image-receiving sheet having the above construction is about 60 to 400 μm.

Figure 2:
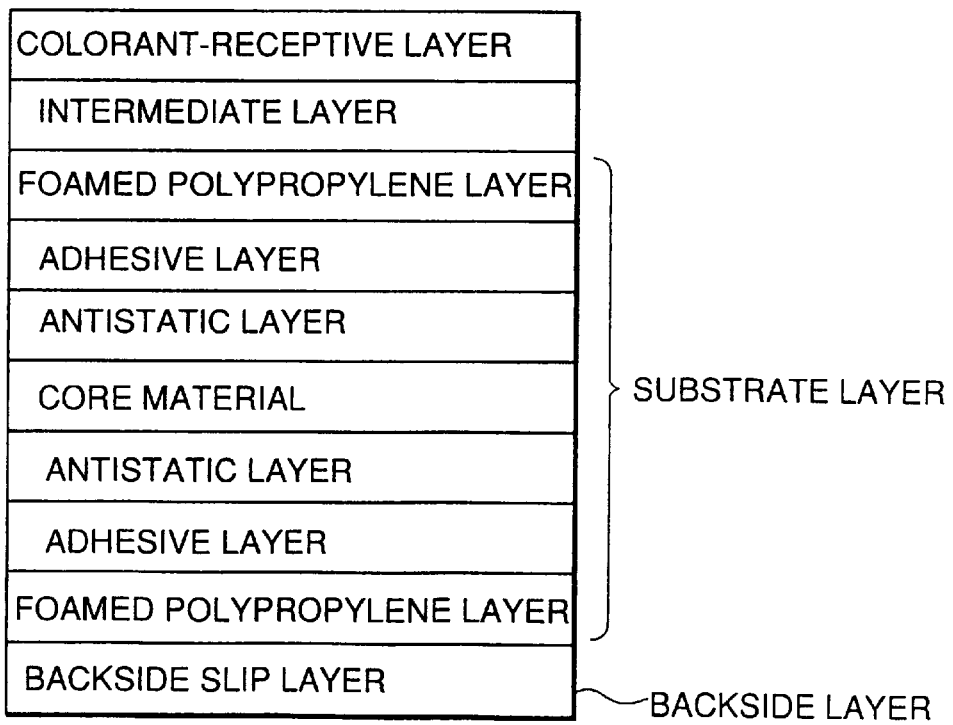
FIG. 2 is a diagram showing the layer construction of a thermal transfer image-receiving sheet according to another preferred embodiment of the present invention.
Figure 3:
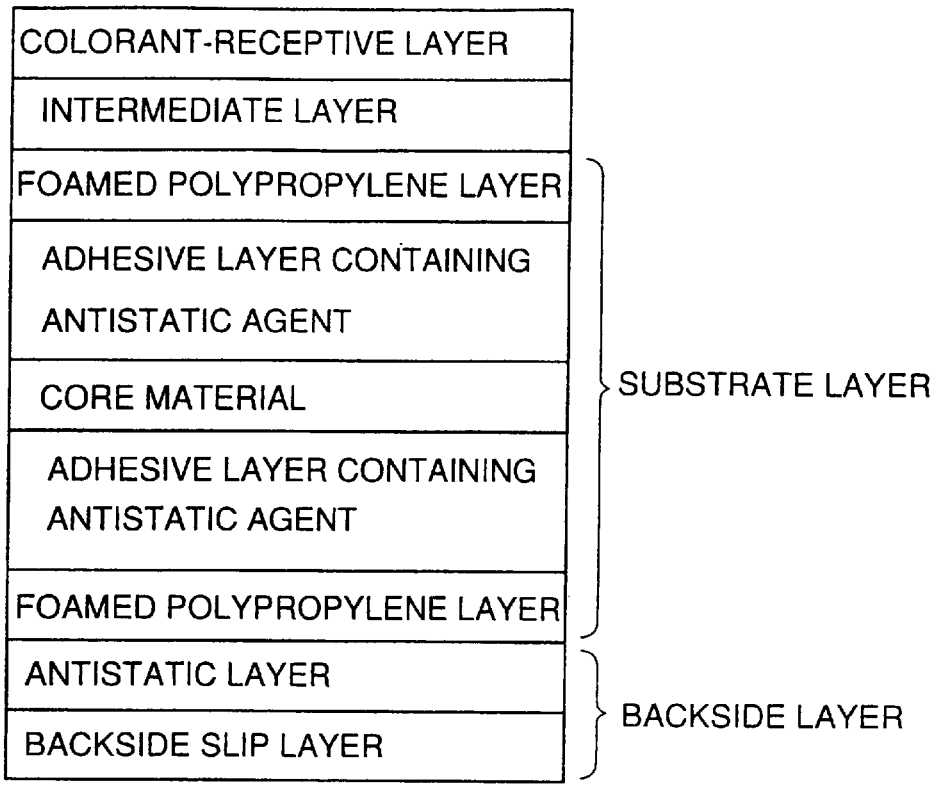
FIG. 3 is a diagram showing the layer construction of a thermal transfer image-receiving sheet according to still another preferred embodiment of the present invention.
Figure 4:
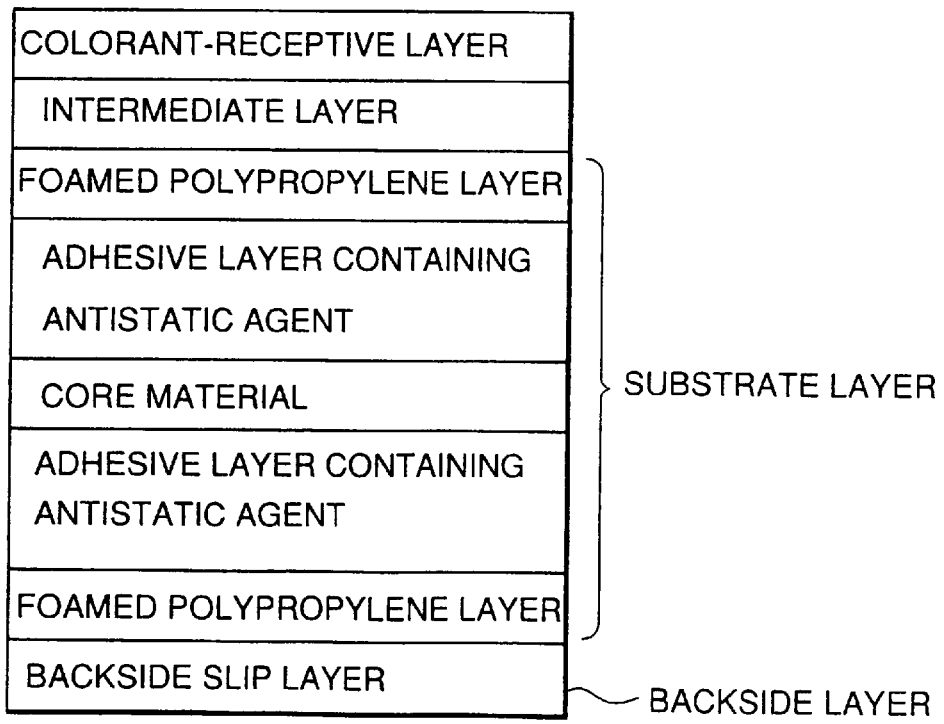
FIG. 4 is a diagram showing the layer construction of a thermal transfer image-receiving sheet according to a further preferred embodiment of the present invention.
Figure 5:
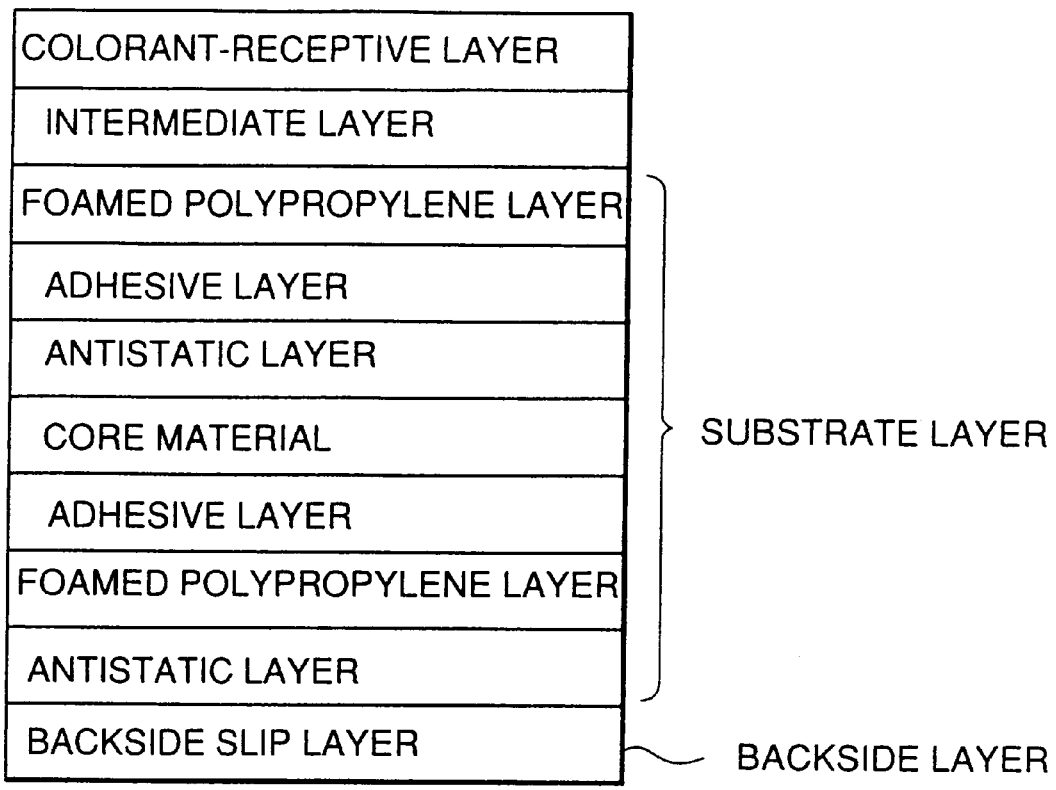
FIG. 5 is a diagram showing the layer construction of a thermal transfer image-receiving sheet according to a still further preferred embodiment of the present invention;
}
Figure 6:
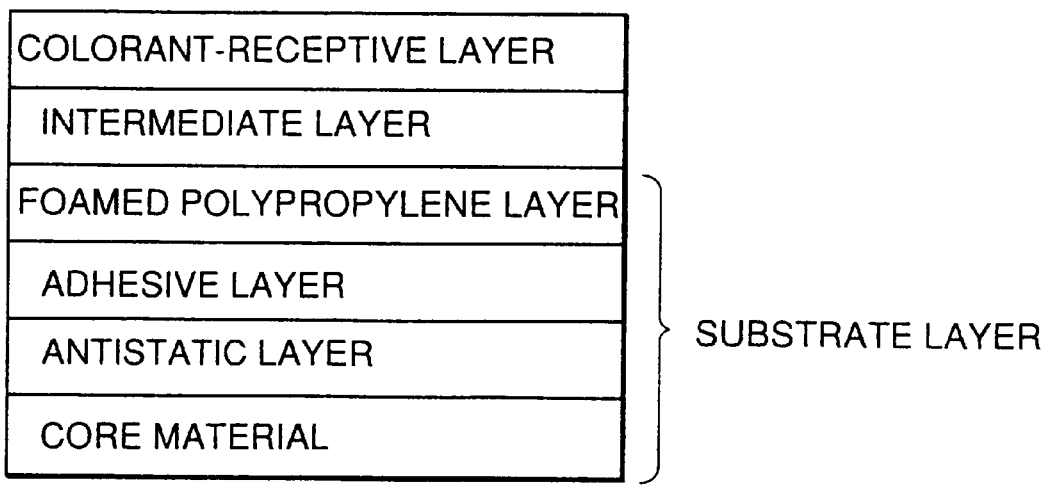
FIG. 6 is a diagram showing the layer construction of a thermal transfer image-receiving sheet according to a still further preferred embodiment of the present invention.

A thermal transfer image-receiving sheet according to another preferred embodiment of the present invention is shown in FIG. 2. The thermal transfer image-receiving sheet shown in FIG. 2 has the same construction as that shown in FIG. 1, except that no antistatic layer is provided between the foamed polypropylene layer and the backside slip layer. A thermal transfer image-receiving sheet according to still another preferred embodiment of the present invention is shown in FIG. 3. The thermal transfer image-receiving sheet shown in FIG. 3 has the same construction as that shown in FIG. 1, except that an adhesive layer containing an antistatic agent, which serves both as the adhesive layer and the antistatic layer, is provided, instead of the antistatic layer and the adhesive layer, on both sides of the core material. The thermal transfer image-receiving sheet shown in FIG. 4 has the same construction as that shown in FIG. 3, except that no antistatic layer is provided between the foamed polypropylene layer and the backside slip layer. The thermal transfer image-receiving sheet shown in FIG. 5 has the same construction as that shown in FIG. 1, except that the antistatic layer is provided on only one side of the core material. The thermal transfer image-receiving sheet shown in FIG. 6 has the same construction as that shown in FIG. 1, except that the antistatic layer, the adhesive layer, the foamed polypropylene layer, the intermediate layer, and the colorant-receptive layer are provided on only one side of the core material. The thickness of each layer and the thickness of the whole thermal transfer image-receiving sheet in the embodiments shown in FIGS. 2 to 6 are the same as those described above in connection with FIG. 1.

The following examples and comparative example further illustrate the present invention but are not intended to limit it.

Example 1

A polyethylene terephthalate (hereinafter referred to as "PET") (W-100, thickness 60 μm, manufactured by Diafoil Hoechst Co., Ltd.) was provided as a core material. The following cationic acrylic resin as an antistatic resin was coated on both sides of the core material to form antistatic layers (thickness 1.0 μm), and the following adhesive layer (coverage 5 g/m²) was coated on each of the antistatic layers, followed by dry lamination of the following cushioning layer onto each of the antistatic layers through the adhesive layers. Thus, a substrate layer was prepared.

Antistatic resin

Cationic Acrylic resin (Elecond PQ-10, manufactured by Soken Chemical Engineering Co., Ltd.) having the following structure:

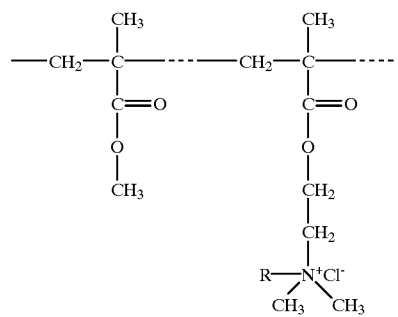

Cushioning layer

Foamed polypropylene film (thickness 60 μm, HDU60, manufactured by Oji-Yuka Synthetic Paper Co., Ltd.)

| Adhesive composition | |
|---|---|
| Polyfunctional polyol (Takelac A-969V, manufactured by Takeda Chemical Industries, Ltd.) | 60 parts |
| Isocyanate (Takenate A-5, manufactured by Takeda Chemical Industries, Ltd.) | 20 parts |
| Ethyl acetate | 120 parts |

An intermediate layer (a primer layer) and a colorant-receptive layer respectively having the following compositions were formed in that order on one side of the substrate layer.

| Intermediate layer | |
|---|---|
| Polyester resin (WR-905, manufactured by Nippon Polyurethane Industry Co., Ltd.) | 13.1 parts |
| Titanium oxide (TCA888, manufactured by Tohchem Products Corporation) | 26.2 parts |
| Fluorescent brightener (Uvitex BAC, CIBA-GEIGY (Japan) Ltd.) | 0.39 part |
| Composition for colorant-receptive layer | |
| Vinyl chloride/vinyl acetate copolymer (Denka Vinyl #1000A, manufactured by Denki Kagaku Kogyo K.K.) | 12.0 parts |
| Epoxy-modified silicone (X-22-3000T, manufactured by The Shin-Etsu Chemical Co., Ltd.) | 0.8 part |
| Amino-modified silicone (X-22-1660B-3, manufactured by The Shin-Etsu Chemical Co., Ltd.) | 0.24 part |

A 0.5 μm-thick antistatic layer was then formed using the above antistatic resin on the surface of the substrate layer remote from the colorant-receptive layer. Further, The following composition for a backside slip layer was coated on the surface of the antistatic layer to a thickness of 1.5 μm on a dry basis, and the coating was then dried. Thus, a thermal transfer image-receiving sheet of the present invention having a layer construction shown in FIG. 1 was prepared.

| Composition for backside slip layer | |
|---|---|
| Acetal resin (Denka Butyral #3000-1, manufactured by Denki Kagaku Kogyo K.K.) | 14 parts |
| Nylon filler (MW 330, manufactured by Shinsoku Toryo Co., Ltd.) | 3 parts |
| Titanium chelate (Orgatix TC-100, manufactured by Matsumoto Trading Co., Ltd.) | 6 parts |
| Silicone oil (X-62-1212, manufactured by The Shin-Etsu Chemical Co., Ltd.) | 1 part |
| Catalyst (CAT-PL-501, manufactured by The Shin-Etsu Chemical Co., Ltd.) | 0.6 part |

Example 2

The procedure of Example 1 was repeated, except that, instead of the antistatic layer in Example 1, an antistatic layer (coverage on solid basis 1.0 g/m²) was formed using the following composition for an antistatic layer. Thus, a thermal transfer image-receiving sheet of the present invention having a layer construction shown in FIG. 1 was prepared.

| Composition for antistatic layer | |
|---|---|
| Cationic acrylic resin (BONDEIP PDX (main agent), manufactured by Konishi Co., Ltd.) | 1.5 parts |
| Epoxy resin (BONDEIP PDX (curing agent), manufactured by Konishi Co., Ltd.) | 1.5 parts |
| Isopropyl alcohol | 66.6 parts |
| Water | 33.3 parts |

Example 3

The procedure of Example 1 was repeated, except that, instead of the antistatic layer in Example 1, an antistatic layer (coverage on solid basis 0.8 g/m$^2$) was formed using the following composition for an antistatic layer. Thus, a thermal transfer image-receiving sheet of the present invention having a layer construction shown in FIG. 1 was prepared.

| Composition for antistatic layer | |
|---|---|
| Sulfonated polyaniline (AQUA-SAVE-01Z, manufactured by Nitto Chemical Co., Ltd.) | 0.5 part |
| Polyester resin (Polyester WR-961, manufactured by Nippon Synthetic Chemical Industry Co., Ltd.) | 9.5 parts |
| Phosphoric ester surfactant (Plysurf 217E, manufactured by Dai-Ichi Kogyo Seiyaku Co., Ltd.) | 0.2 part |
| Isopropyl alcohol | 45.0 parts |
| Water | 44.8 parts |

Example 4

The procedure of Example 1 was repeated, except that no antistatic layer was formed between the backside slip layer and the substrate layer. Thus, a thermal transfer image-receiving sheet of the present invention having a layer construction shown in FIG. 2 was prepared.

Example 5

The procedure of Example 1 was repeated, except that, instead of the antistatic layer and the adhesive layer in Example 1, an antistatic adhesive layer having the following composition was formed. Thus, a thermal transfer image-receiving sheet of the present invention having a layer construction shown in FIG. 3 was prepared.

| Composition for antistatic adhesive layer | |
|---|---|
| Cationic acrylic resin (Elecond PQ-10, manufactured by Soken Chemical Engineering Co., Ltd.) | 10 parts |
| Polyfunctional polyol (Takelac A-969V, manufactured by Takeda Chemical Industries, Ltd.) | 60 parts |
| Isocyanate (Takenate A-5, manufactured by Takeda Chemical Industries, Ltd.) | 20 parts |
| Ethyl acetate | 120 parts |

Example 6

The procedure of Example 3 was repeated, except that, instead of the antistatic layer and the adhesive layer in Example 3, an antistatic adhesive layer having the following composition was formed. Thus, a thermal transfer image-receiving sheet of the present invention having a layer construction shown in FIG. 3 was prepared.

| Composition for antistatic adhesive layer | |
|---|---|
| Sulfonated polyaniline (AQUA-SAVE-01Z, manufactured by Nitto Chemical Co., Ltd.) | 3 parts |
| Polyfunctional polyol (Takelac A-969V, manufactured by Takeda Chemical Industries, Ltd.) | 60 parts |
| Isocyanate (Takenate A-5, manufactured by Takeda Chemical Industries, Ltd.) | 20 parts |
| Ethyl acetate | 120 parts |

Example 7

The procedure of Example 6 was repeated, except that no antistatic layer was formed between the backside slip layer and the substrate layer. Thus, a thermal transfer image-receiving sheet of the present invention having a layer construction shown in FIG. 4 was prepared.

Comparative Example 1

The procedure of Example 1 was repeated, except that the formation of the antistatic layer was omitted. Thus, a comparative thermal transfer image-receiving sheet having a layer construction shown in FIG. 7 was prepared.

The properties of the thermal transfer image-receiving sheets thus prepared were evaluated as follows. Specifically, a black solid pattern was printed using a thermal dye transfer sheet and the thermal transfer image-receiving sheets, prepared in the examples and the comparative example, under environments of 0° C./10% RH, 20° C./20% RH, and 20° C./60% RH. Ten printed sheets were put on top of another, and, in this state, the charged voltage was measured. Further, the number of times of jamming, attributable to static electricity, created in the course of printing on ten sheets was counted. The results are summarized in Table 1. The numerical values in the column of the carriability in the table represents "number of jammed sheets/number of sheets printed without jamming."

TABLE 1

(Results)

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| 0° C. 10% RH | Charged voltage (front) | −0.1 kV | −0.1 kV | −0.1 kV | −0.1 kV | −0.6 kV | −0.6 kV | −0.6 kV | −2.3 kV |
| | Charged voltage (back) | +0.1 kV | +0.2 kV | +0.1 kV | +0.2 kV | +0.6 kV | +0.6 kV | +0.6 kV | +2.6 kV |
| | Carriability | 0/10 | 0/10 | 0/10 | 0/10 | 0/10 | 0/10 | O/10 | 4/10 |
| 20° C. 20% RH | Charged voltage (front) | −0.1 kV | −0.1 kV | −0.1 kV | −0.2 kV | −0.2 kV | −0.2 kV | −0.2 kV | −2.5 kV |
| | Charged voltage (back) | +0.2 kV | +0.3 kV | +0.1 kV | +0.3 kV | +0.2 kV | +0.2 kV | +0.2 kV | +2.8 kV |
| | Carriability | 0/10 | 0/10 | 0/10 | 0/10 | 0/10 | 0/10 | 0/10 | 4/10 |
| 20° C. 60% RH | Charged voltage (front) | −0.1 kV | −0.1 kV | −0.1 kV | −0.1 kV | −0.1 kV | −0.1 kV | −0.1 kV | −2.3 kV |
| | Charged voltage (back) | +0.1 kV | 0.1 kV | +0.1 kV | +0.1 kV | +0.1 kV | 0.1 kV | +0.1 kV | +2.6 kV |
| | Carriability | 0/10 | 0/10 | 0/10 | 0/10 | 0/10 | 0/10 | 0/10 | 2/10 |

Example 8

The procedure of Example 1 was repeated, except that, instead of PET, a paper substrate (Pearl Kote A, 127.9 g/m², manufactured by Mitsubishi Paper Mills, Ltd.) was used as the core material. Thus, a thermal transfer image-receiving sheet of the present invention having a layer construction shown in FIG. 1 was prepared.

Example 9

The procedure of Example 2 was repeated, except that the antistatic layer was provided on only one side of the core material. Thus, a thermal transfer image-receiving sheet of the present invention having a layer construction shown in FIG. 5 was prepared.

Example 10

The procedure of Example 3 was repeated, except that the antistatic layer, the adhesive layer, the foamed propylene layer, and the colorant-receptive layer were provided on only one side of the core material. Thus, a thermal transfer image-receiving sheet of the present invention having a layer construction shown in FIG. 6 was prepared. In this case, one side of the core material functions as the backside slip layer.

The properties of the thermal transfer image-receiving sheets prepared in Examples 8 and 9 were superior to those of the thermal transfer image-receiving sheet prepared in the comparative example although they were inferior to those of the thermal transfer image-receiving sheets prepared in Examples 1 to 7.

Thus, according to the present invention, provision of an antistatic layer in the substrate layer can provide a thermal transfer image-receiving sheet which has low charged voltage even after the formation of an image thereon and in addition has improved carriability.

What is claimed is:

1. A thermal transfer image-receiving sheet comprising at least a colorant-receptive layer and a laminated substrate layer, the laminated substrate layer having at least one antistatic layer therein, said at least one antistatic layer comprising a sulfonated polyaniline.

2. The thermal transfer image-receiving sheet according to claim 1, wherein the laminated substrate layer further comprises at least one layer of a plastic sheet.

3. The thermal transfer image-receiving sheet according to claim 1, wherein the antistatic layer further comprises a cationic acrylic resin.

4. The thermal transfer image-receiving sheet according to claim 1, wherein the laminate substrate layer further comprises a core material, the antistatic layer being provided on both sides of the core material.

5. The thermal transfer image-receiving sheet according to claim 1, which further comprises a backside slip layer, the antistatic layer being further provided between the substrate layer and the backside slip layer.

6. The thermal transfer image-receiving sheet according to claim 1, wherein the antistatic layer has a thickness of from 0.1 to 10.0 g/m².

7. The thermal transfer image-receiving sheet according to claim 1, wherein the antistatic layer has solvent resistance.

8. A thermal transfer image-receiving sheet comprising at least a colorant-receptive layer and a laminated substrate layer comprising a core material with an antistatic layer or an antistatic adhesive layer provided on both sides of the core material and a cushioning layer provided on the surface of both antistatic or antistatic adhesive layers on the core material.

* * * * *